Aug. 27, 1929.  H. W. LONG  1,725,874
SECTIONAL FLOAT
Filed April 20, 1927
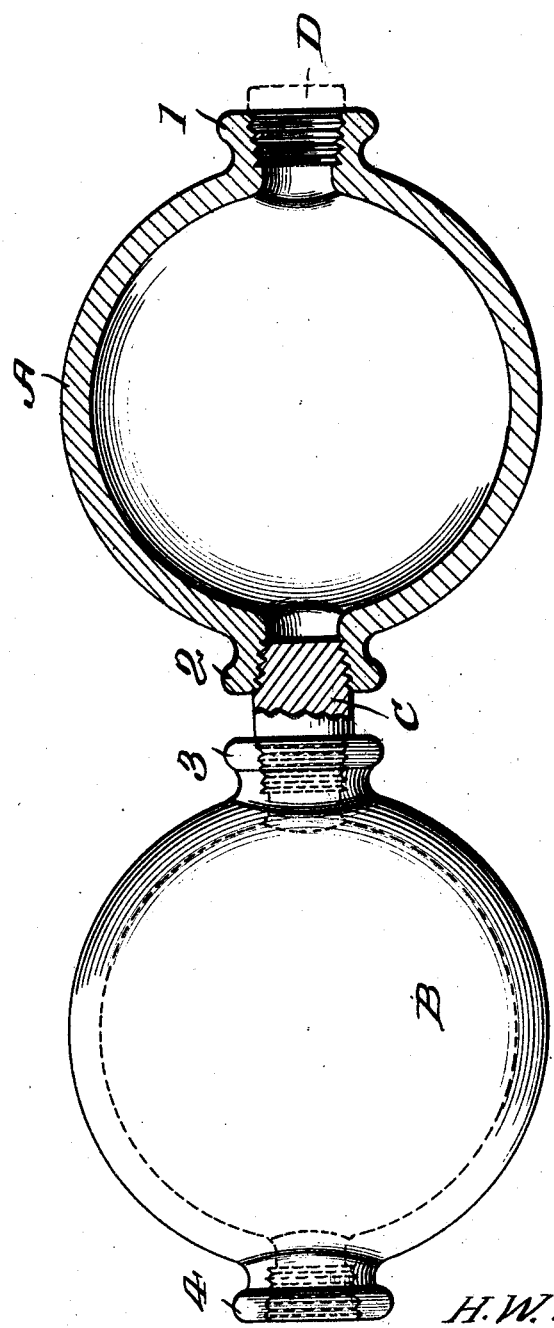
Inventor
H. W. LONG.
By
Attorney Patented Aug. 27, 1929.

1,725,874

UNITED STATES PATENT OFFICE.

HERMAN W. LONG, OF EDNA, KANSAS.

SECTIONAL FLOAT.

Application filed April 20, 1927. Serial No. 185,349.

This invention relates to certain new and useful improvements in sectional floats, especially adapted to be used in connection with automatic separators used for separating liquid from gas under high and low pressures where an automatic valve is used, the object being to provide a float which is formed of a series of spherical sections adapted to be connected together.

Another object of my invention is to provide a float formed of light material which will resist salt water and acid.

Other and further objects and advantages of the invention will be hereinafter set forth and the novel features thereof defined by the appended claim.

In the drawing I have shown a longitudinal section, partly in elevation, of a sectional float composed of two sections, but it is, of course, understood that any number of these sections can be joined together so as to form a float of any size desired.

In the drawing A and B indicate a pair of spherical floats which are preferably formed of cast metal alloyed with non-ferrous metal and other alloys in order to make the metal light, the float sections being provided with oppositely disposed internally threaded nipples 1 and 2, and 3 and 4 respectively.

In constructing a sectional float of two sections, a plug C is employed which is provided with threaded ends adapted to screw into the nipples 2 and 3 so as to rigidly connect the two spherical floats together, the other threaded nipples being adapted to be closed by plugs D.

This constitutes a float formed of two sections and when it is desired to increase the length or size of the float, any number of these these sections can be secured together by plugs C. By forming the sections spherical, the strength of the same is increased so as to prevent the same from collapsing.

While I have shown and described a float formed of cast metal, I am aware that a sectional float can be constructed in a similar manner of spherical glass sections and therefore I do not wish to limit myself to the use of any particular material.

From the foregoing description it will be seen that I have provided a sectional float formed of a number of spherical sections, each being provided with oppositely disposed nipples closed by plugs, one or more of the plugs serving to form a connection between the floats.

What I claim is:—

As a new article of manufacture, a sectional float formed of a plurality of substantially semi-circular shaped hollow bodies, each body being provided with an oppositely disposed internally threaded outwardly extending nipple, the adjacent nipples of said bodies being secured together by a plug having externally threaded ends working in said nipples and plugs for closing the other nipples of said bodies.

In testimony whereof I hereunto affix my signature.

HERMAN W. LONG.